United States Patent [19]

Geissmann

[11] 4,438,684
[45] Mar. 27, 1984

[54] KINETIC FIREPLACE AND SPIT ROASTER

[76] Inventor: Robert Geissmann, 153 Rue de l'Universite, 75007 Paris, France

[21] Appl. No.: 128,036

[22] Filed: Mar. 7, 1980

[30] Foreign Application Priority Data

Mar. 15, 1979 [FR] France .................................. 79 06545

[51] Int. Cl.³ .............................................. A47J 3/704
[52] U.S. Cl. ........................................ 99/341; 99/357; 99/421 P; 99/446; 99/421 V
[58] Field of Search ................ 99/421 V, 421 P, 446, 99/341, 339, 357, 421 R

[56] References Cited

U.S. PATENT DOCUMENTS

| | | |
|---|---|---|
| 1,588,530 | 6/1926 | Currier et al. . |
| 2,049,481 | 8/1936 | Walterspiel ........................ 99/421 V |
| 2,181,847 | 11/1939 | Finizio . |
| 2,549,019 | 4/1951 | Saunders ............................ 99/421 P |
| 2,565,786 | 8/1951 | Spartalis ............................ 99/421 P |
| 2,885,952 | 5/1959 | Campbell . |
| 3,009,410 | 11/1961 | Murphy . |
| 3,221,638 | 12/1965 | Wickenberg ....................... 99/421 P |
| 3,331,310 | 7/1967 | White . |
| 3,604,341 | 9/1971 | Coroneos . |
| 3,744,403 | 7/1973 | Castronuovo ..................... 99/421 P |
| 4,270,444 | 6/1981 | Geissmann ........................ 99/421 V |

FOREIGN PATENT DOCUMENTS

| | | |
|---|---|---|
| 42759 | 9/1887 | Fed. Rep. of Germany . |
| 2515658 | 10/1976 | Fed. Rep. of Germany ... 99/421 V |
| 2641126 | 3/1978 | Fed. Rep. of Germany .... 99/421 P |
| 1099294 | 9/1955 | France . |
| 2331343 | 6/1973 | France . |

*Primary Examiner*—Billy J. Wilhite
*Attorney, Agent, or Firm*—Murray Schaffer

[57] ABSTRACT

A kinetic fireplace having a hearth formed by a horizontal grate surrounded by vertical bars and supported by downwardly extending carrying legs which rest on a horizontal carrying plate having a depending axle. The lower end of the axle is coupled to a primary motor for rotation about the center of said axle, and is rotatably held in a stationary collar supported on a base. A plurality of spaced telescoping columns are secured to the base supporting a hood and peripheral panels. A plurality of tubular arms extend radially outward toward said telescoping columns, on each of which a cylinder is mounted provided with a spit, and a secondary motor for rotating the spit.

15 Claims, 14 Drawing Figures

KINETIC FIREPLACE AND SPIT ROASTER

BACKGROUND OF THE INVENTION

The present invention relates to fireplace devices and installations for fireplaces and more specifically to a portable kinetic fireplace having a triple function; namely to heat, to cook including to grill, and to be decorative as a sculptural mobil.

Numerous devices for heating, cooking and grilling have already been disclosed and commercialized in different types of fireplaces; for instance see German Patent No. 42759, U.S. Pat. Nos. 1,588,530; 2,181,847; 2,885,952; 3,009,410; 3,331,310; 3,604,341 and French Patent No. 1,099,294.

More recently, a new cooker adapted to simultaneously cook a great number of meats on a set of vertical rotary spits mounted in circle about a central hearth has been suggested. This cooker essentially comprises, at the center of a glass panel housing, a central rotary hearth about which are articulated angularly adjustable articulated vertical spits actuated by an independent motor, see French patents filed by the instant applicant, Nos. 2,231,343 and 2,384,475.

SUMMARY OF THE INVENTION

It is an object of the present invention to provide an improved fireplace over those shown in the foregoing patents; namely with respect to the safety and health regulations regarding the articulations, the spit supports, ventilation, cooling and heating, sound-proofing.

Pursuant to the present invention, a new product has materialized: the kinetic fireplace.

This fireplace, being portable, does not require any masonry work for its installation; it further allows all sorts of applications by making use of the various possibilities of the fire, namely in respect of eventual energy shortages since, by making use of ordinary coal, it may serve for heating.

Detailed features of each advantage will now be described in the following description and shown in the accompanying drawings.

DESCRIPTION OF THE INVENTION

Figure 1:
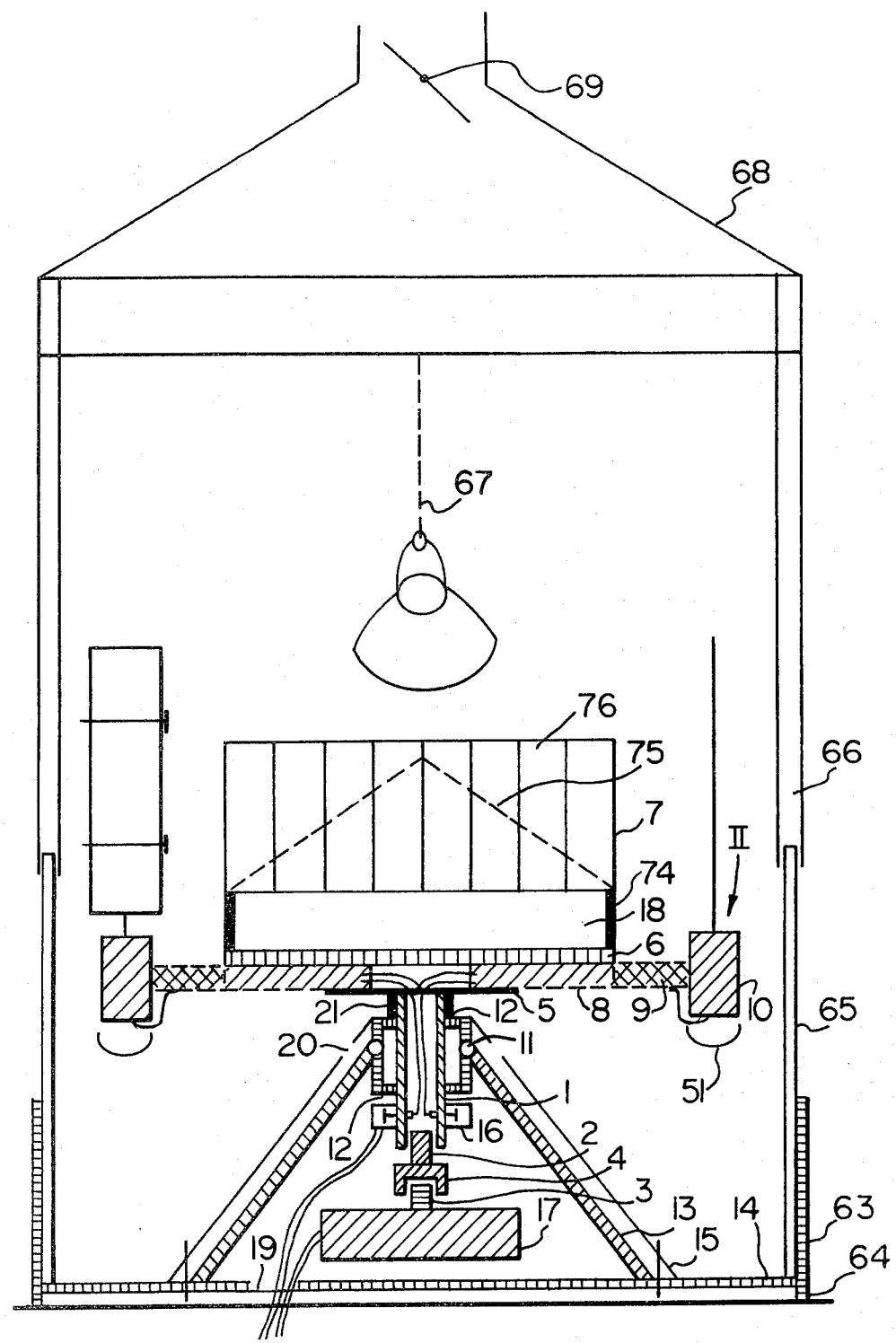
FIG. 1 is a front elevational view, partly in section showing the central hearth and protective housing of the fireplace of the present invention.

FIG. 1 illustrates generally the transportable rotary hearth fireplace. Its basic construction comprises a central axle 1 having, at its base, an elastic sleeve 2 which absorbs jolts while protecting the central axle and the shaft 3 of the central motor 17 against coaxial torsion. In the lower hub of this sleeve, there has been inserted a free wheel clutch 4 which makes it possible, both at rest and in operation, to rotate the hearth and spit system at great speed simply by manual action in order to rapidly intervene at one of the circular points without being forced to wait the slower revolution of the central motor 17.

At the upper end of this central axle 1 is secured a disc 5 having, therebeneath, a bearing washer 21 resting on the thrust bearing 12.

Figure 11:
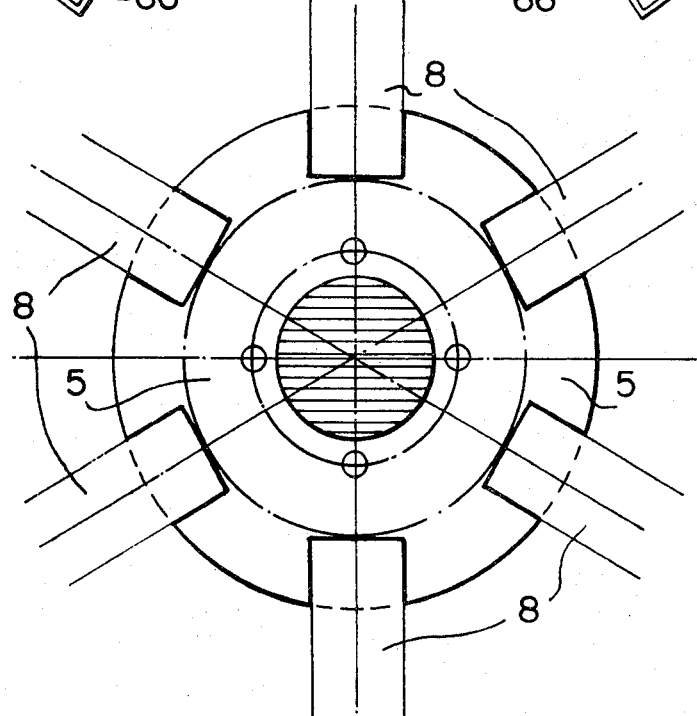
FIG. 11 is an enlarged partial detail of the hearth shown in FIG. 9.

Hollow tubes 8, as seen in FIG. 11, are disposed about an array of dominos or blocks of porcelain or ceramic between this disc 5 and a base plate 6 supporting the hearth 7, as by being appropriately welded to both the disc 5 and plate 6.

Other hollow tubes 9, on which are secured spit holders 10, are slidable within the hollow stationary tubes 8.

All this assembly is held by a cylinder 11 in which the axle 1 is inserted and by the collar or thrust bearings 12 in order to ensure a normal rotation. This cylinder 11 is itself held either by legs 13 which may if desired be covered by a cone or a pyramid 15, for protection. The assembly rests on a large metal tank base 14 by means of an easily dismountable attachment. The legs 13 and cone 15 are adjustable in height by provision of suitable attachments. Further, the plate 5 is adjustable by movement of the axle 1 with collar 12.

Figure 2:
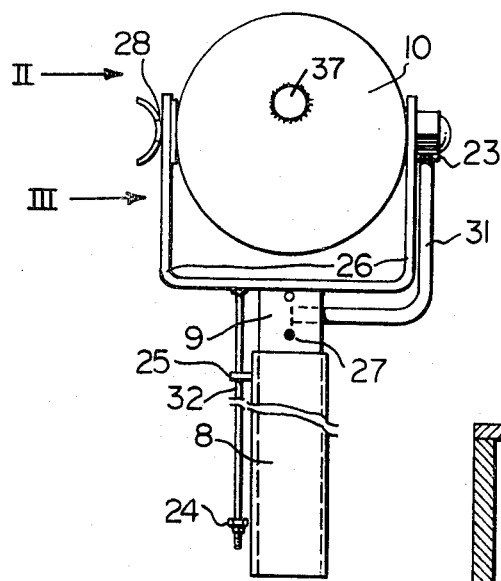
FIG. 2 is a top plan view of the spit motor and support arm taken in the direction of the arrow II, of FIG. 1.
Figure 3:
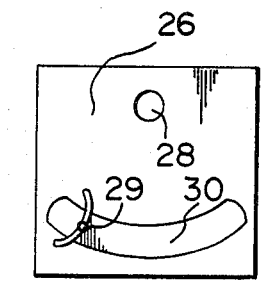
FIG. 3 is a view taken in the direction of III—III of FIG. 2.
Figure 4:
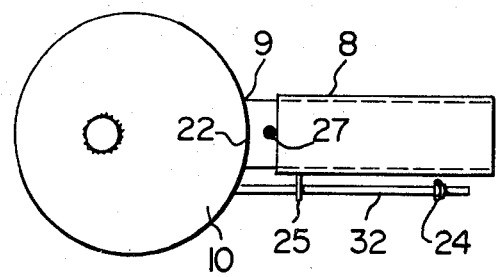
FIG. 4 is a view showing similar to FIG. 2 depicting an alternate embodiment.

The displaceable hollow square tubes 9, which slide into the stationary tubes 8, are secured to the spit holder 10 either directly, in the case the spit holder is held rigidly (FIG. 4) or, by means of a "U" bracket 26 in the case where the spit holder is articulated (FIG. 2). The "U" bracket has two points of articulation 23, 28, with the spit holder. One of these points 28 serves to permit adjustment of the angular position of the cylindrical spit holder and, hence, of the spit; this adjustment being obtained by means of a half crescent made into the "U" bracket 26, (FIG. 3) into which a screw 29 is secured onto the spit holder 10 and which is provided with a clamping wing allowing numerous clamping positions to be made possible and further serving as a stop to prevent accidents should the spit slip.

Figure 5:
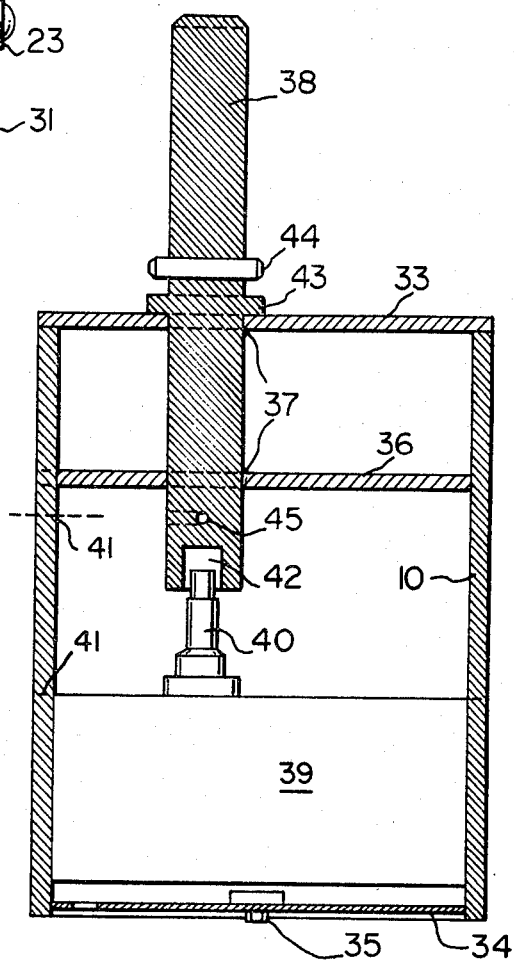
FIG. 5 is an enlarged sectional view of the spit holder and support cylinder.

The placement of electric wires for supplying the spit motors has caused, throughout the years, numerous difficulties which have been resolved here, namely by these means: coming from beneath the large metal base tank 14 and after having gone through the ring contactor 16, the appropriately insulated electric feed wire passes through the hollow center of the central axle 1, the dominos, the hollow tubes 8, 9 to end up at the spit holding cylinder 10. If the arm is rigid, as in FIG. 4, the wire goes directly from the hollow movable tube 9 to the cylinder 10 to an attachment 22. If the arm is articulated as in FIGS. 2 and 3, the wire passes through an outer tube 31 which has one end inserted in a blind nut 23 simultaneously serving as the articulation axle (i.e: a screwed rod) and, at the other end, into the tube. The articulation axle 23 being the place where there will be minimum torsion during inclination. Thus, the electric wire will pass fully covered being protected against fire, ashes, greases and against too strong twisting into the cylindrical spit holder 10. As seen in FIG. 5, the spit holder contains a motor 39 and switch 35.

In all of the above, it is essential that the telescopic tubes 8 and 9 have their inner surface free of any incumbencies such as bolts, stops, etc. in order to prevent the electric wires, which are extensible, from being damaged or sheared or incumbered in their movement due to the telescopic action of the tubes 8 and 9. However, two stops are provided. One stop, to prevent the sliding tube 9 from coming out of the tube 8 if the spit and its support are drawn outwardly comprises a rod 32 welded onto the spit holder 10 (FIG. 4) or onto the "U" bracket 26 (FIG. 2), which rod passes through a ring 25 terminating, for instance, in an adjustable nut 24 that will act as adjustable stop. The other stop, for the opposite case where the spit and its holder are pushed inwardly, comprises a pin 7 which is simply located on the tube 9. This prevents shearing of the electric feed wires and crushing of the tube 31 (FIG. 2).

The spit holder 10 (FIG. 5) is formed of a hollow cylinder 10 hermetically sealed at its upper end by a disc 33 (obviously a pressed part would also be convenient) and is provided at its lower end with a perforated removable disc 34 which protects the motor 39 while allowing it to be ventilated. The lower disc 34 supports a switch 35 which is thus protected from ashes or flowing greases and is provided with flaps or movable shutter plate to regulate the total area of the perforation therein. A flat iron bracket 36, perforated at 37 along the same axis as the hole through the upper disc 33, allows for the passage of the spit axle 38 while maintaining it vertical. The motor 39 is secured by means of legs either to the cylinder 10 or to the flat bracket 36 in such a manner that its shaft 40 is in alignment with a socket 42 in the lower end of the axle 38. Driving of the spit axle 38 is obtained either by providing the shaft 40 and socket 42 with a simple pin having proper clearance to avoid torsion. The cylinder 10 is cut as at 41, so that its lower portion is removable, allowing easy access for mounting or repairs. The socket hole may have a flat face cooperating with a similar flat face provided on the shaft 40 of the motor. In this manner the spit axle is supported floatingly so that the motor does not have to support any axial or lateral forces, and the cylinder need not be cut.

A washer 43, integral with the spit axle 38, is located in such a manner that the weight of the spit and of the meat is supported by the upper disc 33 of the spit holder and creates no force acting on the motor 39. The spit provided with a hollow sleeve can thus be slidably mounted on the axle 38 and will bear against a pin 44 extending traversely through the axle 38 serving as a thrust member as well as a connecting member to drive the spit. A pin located at 45 will prevent the axle from being drawn upwardly should a spit cling to it. The aforedescribed assembly of spit holder and sliding tubes has solved the problems relevant to greases, ashes, electric short circuit, motor ventilation, effortless operation of the motor 39.

Figure 7:
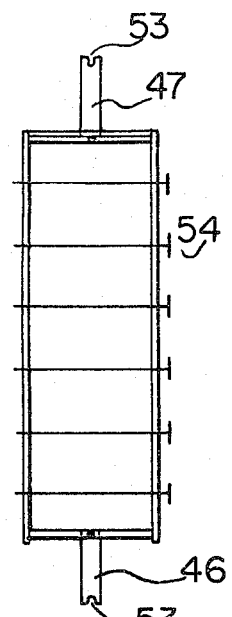
FIG. 7 is an enlarged view of a rectangular spit.
Figure 6:
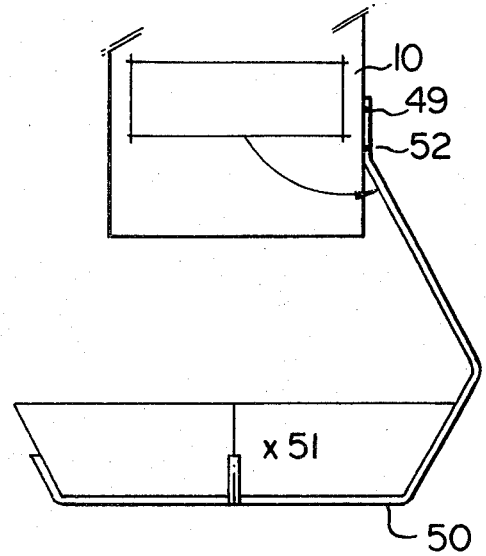
FIG. 6 is an enlarged view of the spit support and drip pan employed in the fireplace of FIG. 1.
Figure 8:
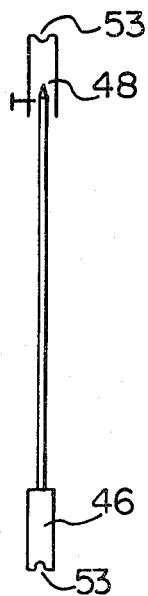
FIG. 8 is an enlarged view of a spear spit.

As seen in FIG. 6, a support 50 provided with a cross piece 52 secured at 49 on the cylinder 10 allows for the mounting of a removable grease pan, for instance in the form of a pan 51, beneath the cylinder 10 at a convenient distance not to hinder the ventilation of the motor 39. In order to prevent the greases from overflowing when the spits and their cylinder 10 tilt, the mounting is in such a manner as to cause the support 50 to be oscillatable with the same process indicated at 29, (i.e. pivotable about the axis of the securement 49 and held by a damp). On the other hand, the grease collected in the pan 51 will be protected by the cylinder 10 from the cinders coming from the hearth 7. For health and practical considerations, the coupling of the spits 46 with the rotary axle 38 must be carried out in such a manner that the ashes or the greases may not accumulate thereon. Thus, as seen in FIGS. 7 and 8, the spit portion 46 will always be the female portion and the axle 38 the male portion so that the spit fits over the axle. In practice, coupling is achieved by means of a hollow tube 46 (FIGS. 7 and 8) comprising a split coupling 53 which avoids, in the case where the user turns the spit contrary to the direction of rotation of the motor 39, damage to the gears of the speed reducer. This disconnectible coupling or clutch is located at each end of the spits to allow them to be reversible (see 46, 47). With respect more particularly to pointed spits, FIG. 8, allowing spitting of meats, this disconnectible coupling becomes removable being simply held by a clamping wing bolt 48.

Figure 10:
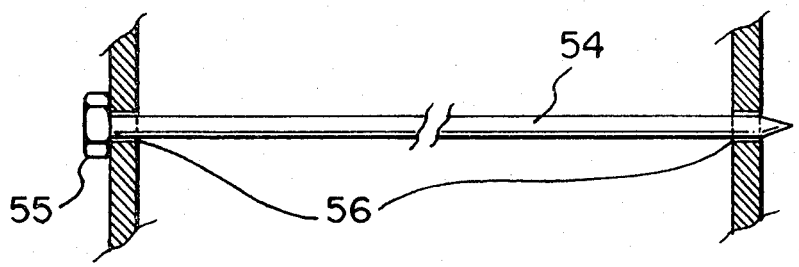
FIG. 10 is an enlarged view of a needle holder for use in the spit of FIG. 7.

In FIG. 7, a rectangular spit is shown having needles 54 shown in detail in FIG. 10. In order that the needles do not block the rotation of the motor 39 when touching the vertical walls of the hearth 7, one of the ends of the needle is provided with a flat washer 55. Furthermore, in order that the needle may not slide in the other direction and fall off, small grooves 56 are provided in the needle at locations where they cross the walls of the rectangular spit.

Figure 13:
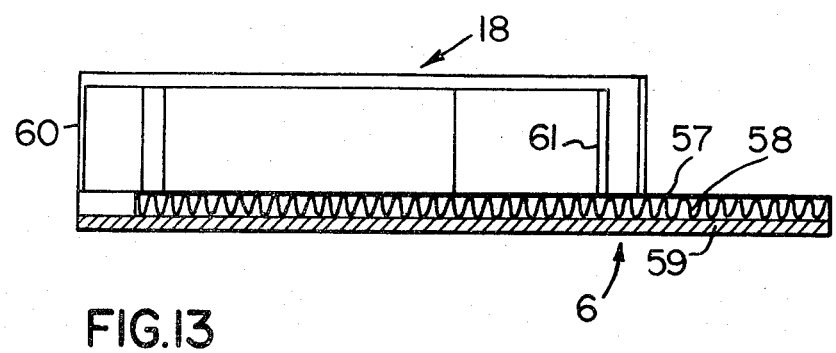
FIG. 13 is an enlarged partial view of the fire box and ashtrays of the hearth shown in FIG. 1.

As seen in FIG. 13, the horizontal base plate 6 (FIG. 13) supporting the hearth is formed of insulating material in order to reduce to the maximum radiation caused by conductibility of the heat. The insulating material 58, is inserted between the two plates 57 and 59, one of which has a peripheral edge made in such a manner that the insulating material is embedded therein so that it is not visible. This serves also to protect particularly the electric wires coming through the central hollow axle 1 towards the relay made up by the porcelain domino or dominos supported by a small plate itself secured onto and beneath the horizontal plate 6 at 59.

Extending upwardly from the plate 6 are a plurality of spaced legs 74 which supports a horizontal grate of polygonal or circular shape and a concial grate 75. Surrounding the conical grate 75 are a plurality of contiguous removable bars or screens 76 which enclose the hearth.

Figure 14:
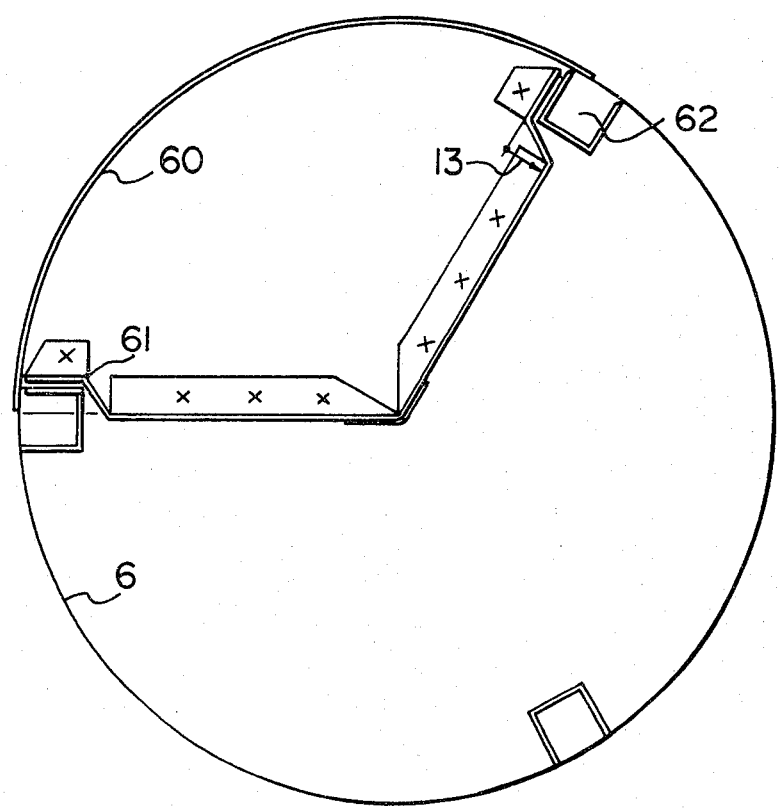
FIG. 14 is a plan view of the bottom wall of the hearth shown in FIG. 1.

Resting on the plate 57, between the legs 74 and consequently beneath the horizonal grate of the said hearth 7, are ashtrays 18 distributed so that they do not come into contact gainst the hearth legs. The legs have a height that takes into account the depth of the ashtrays which themselves are a function of the quantity of ashes falling from the hearth. These ashtrays seen in detail in FIGS. 13 and 14 have the shape of circular sectors, having an outer wall 60 and an inner wall 61. In this manner, they also serve an insulating purpose by leaving an air space beneath the hearth and a regulating purpose for the incoming air coming from beneath the hearth; thus, the intensity of the fire may be controlled, cooking may be adjusted and a saving of energy may be realized. By moving them apart a few millimeters, a space may be opened or closed through which air may come in due to the edges 60 of one tray being higher than the edges at 61 of another tray. Furthermore, as there are at least three legs in the hearth, there are also three ashtrays capable of thus achieving an independent adjustment so that if it is desired for instance to cook more forcefully a piece of meat mounted on one spit than that mounted on another spit, it can be done. It is possible also to incline the outer edges 60 of the ashtrays inwardly to prevent grease from flowing and causing flames, and by the same mode this inclination serves a deflecting purpose. The important technical point is the following: it is important that the vertical bars 76 of the hearth 7, the outer edge of the ashtrays 18, the horizontal plate 6 be, to a few millimeters, in alignment to avoid that a spit hit some projection.

It is possible to provide an embodiment that does not require infeed of electric current to the spit holder 10. The motor 39 may be made to operate on batteries or through a mechanical means. In this embodiment, the horizontal plate 6 may be lower because the bronze rings of the commutator 16 are eliminated, the bearing cylinder 11 can be shortened. The feed means for the central motor 17 can, however, remain unchanged.

The support legs 13, or the frustum of cone or pyramid 15 (FIG. 1) are secured on the large metal tank 14 which has a double edge 63, 64 thus allowing the kinetic fireplace to be portable and transportable since there is no masonry work.

Figure 9:
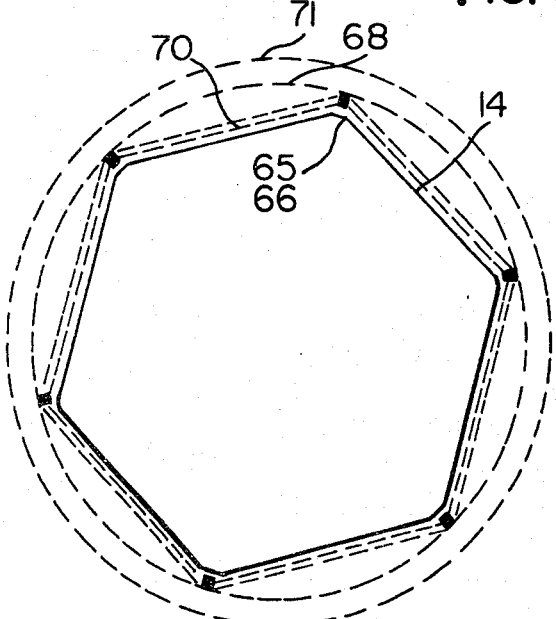
FIG. 9 is a plan view of the hearth.

Telescoping columns 65, 66 are secured on the metal tank which affords the following advantages; a pot hanger 67 may be suspended over the hearth 7 for cooling; a hood 68 or even a double hood 71 (FIG. 9) can be suspended to evacuate smoke and odors if the fireplace is located inside a house. It is also possible as seen in FIG. 9, to insert glass or metal panels 70 with insulating material in case the fireplace is to rest against a wall. Adjusting heating of the surrounding space is obtained namely by the following means: the panels 70 are of the adjustable opening type for at least one of them; by the same token, they serve as door to give access to the inside of the structure; the second hood 71, located over the first one with or without additional insulating material, is articulated by a set of twin shells sliding one over the other and permitting partial or total covering of the first hood 68 directly heated by the fire therebeneath; furthermore, an adjusting valve may be added at 69, responsive to a room thermostat.

Draft adjustment may be provided by one or all of the following means; variation in the height of the hearth 7 by the telescopic action of the legs 13; variation in the height of the hood with respect to the base 14, thus with respect to the hearth, by the telescopic action of the columns 65, 66.

Figure 12:
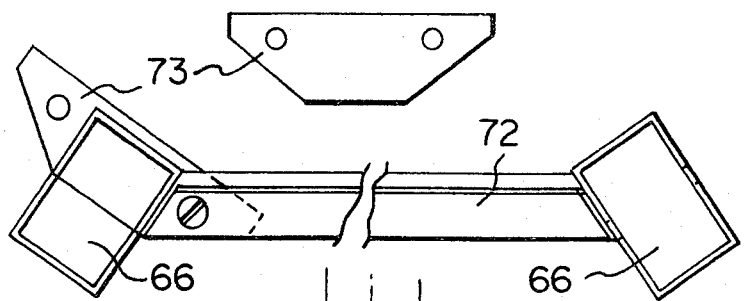
FIG. 12 is a plan view of the spit arms and their support.

Ventilation and cooling is achieved for the sliding tubes 8 and 9 by aeration due to the fact that the tubes are held between the two plates 5 and 6 in such a way that there is free space therebetween as indicated in FIG. 11. The electric wires passing toward and through the tubes, as well as the dominos are, by this fact cooled as well as the relay dominos. Furthermore, the tubes 8 are secured in such a manner beneath the plate 6 that there is a layer of air formed between them and the plate over the major portion of their surface by inserting a certain number of spacers. The metal tank 14 having a double edge has several effects on ventilation and draft; its lower edge 64, forming depending feet, allows the passage and the protection of electric wiring beneath the plate 14. By placing the wires in flat tubes, passing through an aperture 19, the electrical wiring is brought to the hollow central axle 1 to its motor 17 and to all components inside the cone 15, while letting in air. Furthermore, the aperture for air coming from the outside will serve simultaneously to feed the chimney, which may be adjusted by partial blocking of air outlet holes 20 located in the upper portion of the frustum of cone 15. The upper edge 63 of the tank walls has the function of retaining cinders coming from the hearth 7 in a way that makes it possible to ventilate the motors 39 through a perforated plate 51 located beneath the cylinder 10, the edges 63 acting as deflectors or adjustable shutters. Any problem with the possible expansion of the panels 70 (FIG. 9), namely when they are made of glass, is solved by resting their upper and lower parts over simple angle braces 72 secured on the columns 66 and 72 (FIG. 12) with the lateral parts of the said panels resting against the columns 66. Due to the fact that the columns are rectangular and aligned, the glass panels may expand without the danger that they break. Furthermore, they may be held in position by movable elastic metal fingers as shown in FIG. 12. Since the panels are not force fit, a small air draft circulates towards the inner depression and prevents smoke from moving out.

To ease the transportation of large models measuring over 280 cms in height and 230 cms in diameter, the upper and lower angel braces 72 are made removable by means of brackets 73 slid into grooves made in the columns 66, the braces are then secured by flat screws so as not to break the glass panes.

The kinetic fireplace may be rapidly transformed into a color mobil having solely a decorative and spectacular effect by the following means: instead of spits and by the same coupling process, use is made of cylinders having multiple reflecting faces, for instance small mirrors or a polished and reflecting metal having multiple faces, the said cylinders being actuated by the same motors used for the spit holders 10. Instead of the hearth, a reflecting spherical, pyramidal or cylindrical structure reflecting as the cylinders mentioned above and provided with a set of light bulbs of different colors eventually inserted in appropriate corners of which the intensity is variable can be provided. This central reflecting structure is capable of rotating in the direction reverse the preceding cylinders or in direction reverse that of the plate 6, through another motor located on the plate 6. Models that are not transformable into kinetic fireplace may also be built; in this latter case, driving of the reflecting cylinders mentioned above, in order to avoid the use of a plurality of motors, may be realized by a stationary crown over which the lower end of the said cylinders would rub, the said cylinders themselves being driven by the central motor 17 by the tubes 8, 9, the resultant of these force couples being a circular movement of the said cylinders without the use of motors 39 and only with the motor 17.

Inside the hearth 7, a cone 75 or a metallic pyramidal form is located in such a manner that the cone does not extend beyond the top of the hearth bars, in order to achieve energy savings; indeed, the said cone being wider at its base than at the top, the combustible material thus falls down as it is consumed at the base of the hearth.

I claim:

1. A kinetic fireplace comprising a tank-like base, a stationary collar supported on said base, and a primary motor mounted below said collar, a hearth formed by a horizontal grate, having upwardly vertical bars and downwardly extending carrying legs, said legs resting on a horizontal carrying plate having a depending central axle rotatably held in said stationary collar, the lower end of said axle being coupled to said primary motor for rotation about its central axis, a plurality of spaced telescoping columns secured at their lower ends to said base, a hood supported by the upper end of said columns, and panels located between the columns surrounding said hearth, said panels being at least, in part, removable to permit access to said hearth, a plurality of tubular arms secured beneath the horizontal grate and extending radially outward toward said telescoping columns, each of said arms having a slide extension at the end of which a cylinder is mounted provided with a spit, and a secondary motor for rotating each of said spits about an axis radially spaced from said central axle.

2. The fireplace according to claim 1 wherein said collar is supported on said base by a plurality of adjustable legs whereby the height of said hearth above the base may be selected.

3. The fireplace according to claim 2, including a cover member overlying said adjustable legs.

4. The fireplace according to claim 1 wherein said carrying plate is formed of a laminar construction of two metalic plates having a thermally insulating layer therebetween.

5. The fireplace according to claim 1, 2 or 4 including a plurality of ashtrays located beneath said horizontal grate, said ashtrays being at least, in part, the shape of a circular sector thereby in combination covering the area below said hearth and having in combination a periphery conforming to the shape of said hearth.

6. The fireplace according to claim 5 wherein said ashtrays are removable and adjustable in position beneath said hearth and are provided with peripheral walls allowing flow of air thereover into said hearth.

7. The fireplace according to claim 1 wherein said hood is provided with a central opening forming a chimney and means for selectivity occluding said opening to control the draft therethrough.

8. The fireplace according to claim 1 wherein said central axle is hollow, and is provided with an annular commutator on its exterior surface, and connecting wires from each of said commutator sections through each of said tubular arms to the motor mounted thereon, and brush means connected to a source of electric current making contact with said commutator.

9. The fireplace according to claim 8, including a free wheeling clutch coupling connecting said axle to said primary motor.

10. The fireplace according to claim 8 wherein said secondary motors are battery operated.

11. The fireplace according to claim 1 wherein the panels are supported at their upper and lower end on corner angles secured on the columns and, at their lateral edges, by said columns, the said columns being arranged so as not to be parallel, whereby on expansion, slide over the columns and are adjustable with respect thereto to provide air draft towards the interior of said hearth, said corner angles (72) being removable to permit disassembly of said fireplace.

12. The fireplace according to claim 1 wherein said spit cylinder is connected to said arm extension by a U-shaped bracket in which said cylinder sits, said cylinder being provided with a pair of fixed opposed bolts extending into a hole in each arm of said bracket, at least one of said bolts being provided with clamp means to selectively fix and retain said cylinder relative to said bracket, whereby said cylinder may be made to tilt from a vertical axis.

13. The fireplace according to claim 12, including a drip pan located beneath said cylinder including means for loosely hanging said drip pan from said bolts whereby said drip pan remains horizontal regardless of the position of said cylinder.

14. The fireplace according to claim 1 wherein said arm and extension are provided with stop means limiting their inward and outward relative movement.

15. The fireplace according to claim 1 wherein said axle and motor are coupled by a free wheeling unidirectional clutch.

* * * * *